United States Patent
Li (10) Patent No.: US 12,150,592 B2
(45) Date of Patent: Nov. 26, 2024

(54) DEVICE AND KIT FOR COOKING WITH FRAME AND INSERT

(71) Applicant: Yong Li, LaSalle (CA)

(72) Inventor: Yong Li, LaSalle (CA)

(73) Assignee: SHAOXING OU AI DI MEDICAL TECHNOLOGY CO., LTD., Zhejiang (CN)

( * ) Notice: Subject to any disclaimer, the term of this patent is extended or adjusted under 35 U.S.C. 154(b) by 553 days.

(21) Appl. No.: 17/520,321

(22) Filed: Nov. 5, 2021

(65) Prior Publication Data

US 2023/0142557 A1 May 11, 2023

(51) Int. Cl.
| | |
|---|---|
| *A47J 37/10* | (2006.01) |
| *A47J 36/02* | (2006.01) |
| *A47J 37/06* | (2006.01) |
| *A47J 37/07* | (2006.01) |
| *A47J 45/06* | (2006.01) |

(52) U.S. Cl.
CPC ............ *A47J 37/108* (2013.01); *A47J 36/02* (2013.01); *A47J 37/067* (2013.01); *A47J 37/0786* (2013.01); *A47J 45/061* (2013.01)

(58) Field of Classification Search
CPC .. A47J 37/0605; A47J 37/0611; A47J 37/067; A47J 37/0676; A47J 37/0682; A47J 37/0786; A47J 37/10; A47J 37/108
See application file for complete search history.

(56) References Cited

U.S. PATENT DOCUMENTS

| | | | | |
|---|---|---|---|---|
| 100,397 | A | * | 3/1870 | Hamilton ............ A47J 37/0611 |
| | | | | 99/425 |
| 403,407 | A | * | 5/1889 | Armour ................. A47J 37/10 |
| | | | | 99/425 |
| 4,170,302 | A | | 10/1979 | Baca |
| 6,024,014 | A | * | 2/2000 | Kasai .................... A47J 37/067 |
| | | | | 99/425 |
| RE43,839 | E | | 12/2012 | Henry et al. |
| 9,119,500 | B2 | | 9/2015 | Hamlin |
| 9,301,646 | B2 | | 4/2016 | Rosa et al. |

(Continued)

FOREIGN PATENT DOCUMENTS

| | | | | | |
|---|---|---|---|---|---|
| BE | | 820962 A | * | 2/1975 | ............ A47J 27/002 |
| EP | | 2140786 A1 | * | 1/2010 | ............ A47J 27/002 |

OTHER PUBLICATIONS

BE 820962 A (Schapira, Rene) Feb. 3, 1975 [retrieved on Jun. 14, 2024]. Retrieved from Foreign Image and Text database. (Year: 1975).*

*Primary Examiner* — John J Norton (57) ABSTRACT

A device for cooking foodstuff includes a frame having an opening; and an insert removably coupled to the frame at the opening. The coupled frame and insert form a cooking plate comprising a top cooking surface for supporting foodstuff thereon and a bottom heat-receiving surface for receiving heat from a heat source. The insert comprises a first side having a generally flat surface and a second side having a corrugated surface comprising a pattern of ridges. The insert can be coupled to the frame with the first or second side facing up so that the side that is facing up forms a part of the top cooking surface. A set of cookware is also provided, which includes the frame and a plurality of such inserts, wherein the inserts differ from one another in at least one of dimension, shape, and composition.

20 Claims, 8 Drawing Sheets

(56) References Cited

U.S. PATENT DOCUMENTS

| | | |
|---|---|---|
| 9,572,350 B2 | 2/2017 | Reinhart et al. |
| 9,723,949 B2 | 8/2017 | Moore |
| 10,612,788 B2 | 4/2020 | Lah et al. |
| 11,076,718 B2 | 8/2021 | Borovicka |
| 2003/0024399 A1* | 2/2003 | Lange .................. A47J 37/108 99/425 |
| 2014/0311356 A1* | 10/2014 | Daniels ............... A47J 37/0713 99/340 |

* cited by examiner

DEVICE AND KIT FOR COOKING WITH FRAME AND INSERT

FIELD

The present disclosure relates generally to cookware and kits of cooking devices, and particularly to devices and kits for baking and grilling with detachable inserts.

BACKGROUND

Various cookware have been used for centuries. For example, stone or metal cooking plates have been used for baking foodstuff, such as pizza and bread. Frying pans and skillets have been used to fry or grill foodstuff.

SUMMARY

It has been realized that a cookware with a frame and an insert can be conveniently used to provide both a griddle and a grill.

Accordingly, in an aspect of the present disclosure, there is provided a device for cooking foodstuff. The device comprises a frame having an opening; and an insert removably coupled to the frame at the opening. The frame and insert when coupled to each other form a cooking plate comprising a top cooking surface for supporting foodstuff thereon and a bottom heat-receiving surface for receiving heat from a heat source. The insert comprises a first side having a generally flat surface and a second side having a corrugated surface comprising a pattern of ridges. The insert is couplable to the frame with the first or second side facing up so that the first or second side that is facing up forms a part of the top cooking surface.

In different embodiments of the device, one or more of the following features may be provided or included. The device may be configured and sized to be placed on and to receive heat from an oven, stove, or barbecue grill. The opening of the frame and the insert may have generally circular profiles. The frame may comprise at least one handle. The frame may have a generally circular outer perimeter, and may have an outer diameter of from 15 cm to 75 cm. The frame may have a generally annular ring shape. The opening of the frame may be generally circular and have a diameter of from 10 cm to 50 cm. The frame may have a thickness of from 1 cm to 5 cm. The insert may be configured and sized so that the insert is placeable on a flat top surface of a frying pan or skillet to provide a cooking surface on the frying pan or skillet. The opening of the frame may comprise a stepped inner edge for supporting the insert. The stepped inner edge may be configured and sized so that a top surface of the insert is flush with a top surface of the frame when the insert is coupled to the frame and supported at the stepped inner edge. At least 50% of the total surface area of the second side of the insert may be corrugated. The insert or the frame, or both, may comprise cast iron or cast aluminum. The insert may comprise a plate having a thickness of from 0.5 cm to 2.5 cm. The plate may be a circular plate having a diameter of from 10 cm to 50 cm. The frame may have a generally rectangular outer perimeter.

In another aspect, a set of cookware may be provided, which includes a frame as described herein and a plurality of inserts each as described herein. The inserts differ from one another in at least one of dimension, shape, and composition. For example, the inserts may be circular and differ from one another in diameter. The set of cookware may further comprise a frying pan or skillet. The frying pan or skillet may have a size that is suitable for use with at least one of the inserts.

Other aspects, features, and embodiments of the present disclosure will become apparent to those of ordinary skill in the art upon review of the following description of specific embodiments in conjunction with the accompanying figures.

BRIEF DESCRIPTION OF THE DRAWINGS

In the figures, which illustrate, by way of example only, embodiments of the present disclosure.

DETAILED DESCRIPTION

Example embodiments disclosed herein relate to cookware, particularly cookware for baking and grilling.

In some embodiments, the cookware includes an insert and a frame, which can be coupled to form a griddle or grill for baking or grilling. The insert can also be conveniently combined with other cookware such as a skillet or frying pan to provide a new cooking device.

Conveniently, the same insert is configured to provide either a griddle or a grill by simply flip the insert around.

As an illustrative example, a first embodiment of a device 10 for cooking food stuff is shown in FIGS. 1 to 11.

Figure 1:
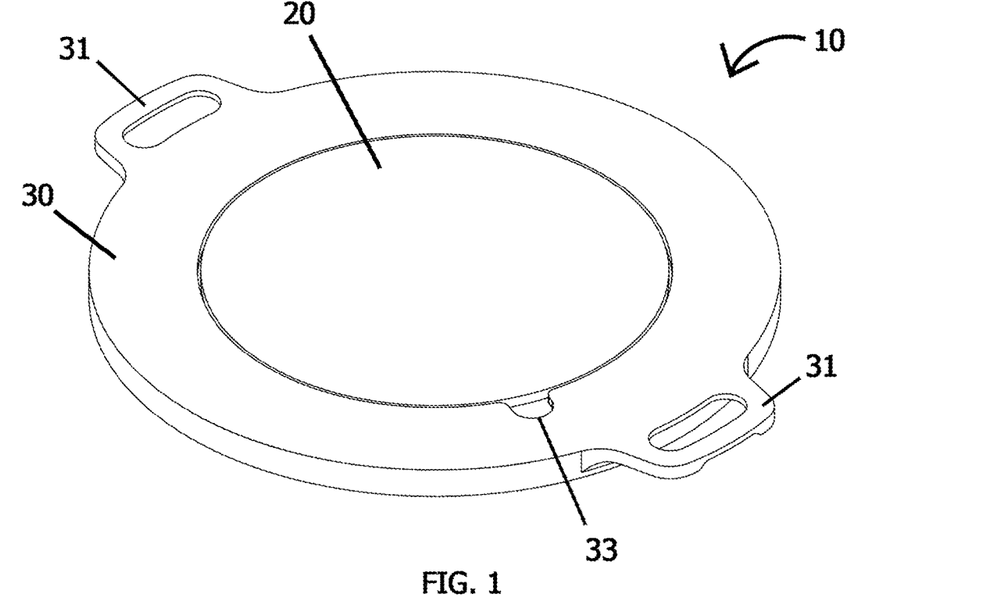
FIG. 1 is a top perspective view of a device for cooking, which include an insert and a frame, in accordance with an embodiment of the present disclosure.

Device 10 is a cookware or bakeware, and can be used for cooking, such as baking, grilling, roasting, broiling, or the like. Device 10 may be considered as a baking and grilling plate assembly. As depicted in FIG. 1, an embodiment of device 10 may include two components. The first component is an insert 20, which as depicted may be a circular insert plate. The second component is a frame 30, which can function as a carrying plate for conveniently carrying and handling the insert 20.

As better illustrated in FIGS. 3, 4 and 7-10, the depicted insert 20 has a generally circular profile or disc shape. A first side 22 of the insert 20 is generally flat. A second side 24 of the insert 20 has a corrugated central surface portion with a pattern of ridges 25, and has an annular edge portion, which is generally flat. The corrugated central portion with the ridges 25 may cover at least 50% of the total surface area of the second side of the insert 20.

In some embodiments, insert 20 may have a circular disk shaped body having a diameter of from 10 to 50 cm and a thickness of from 0.5 to 2.5 cm.

The insert may be made of cast iron, cast aluminum, a composite cooking material, or any other suitable material for cookware used to bake or grill foodstuff. Other suitable materials may include stainless steel, carbon steel, copper, clad, non-stick materials or coating materials such as perfluorooctanoic acid (PFOA) or polytetrafluoroethylene (PTFE), or ceramic materials.

As better illustrated in FIGS. 1-6 and 11-12, the frame 30 may also have a generally circular profile or annular ring shape. Frame 30 has a central opening 32 configured and sized for receiving and supporting the insert 20 therein so that the insert can be coupled to the frame during use. The opening 32 may have a stepped inner edge sized to support the insert 20. Frame 30 has a top side 34 and a bottom side 35 and an outer edge 36.

Figure 2:
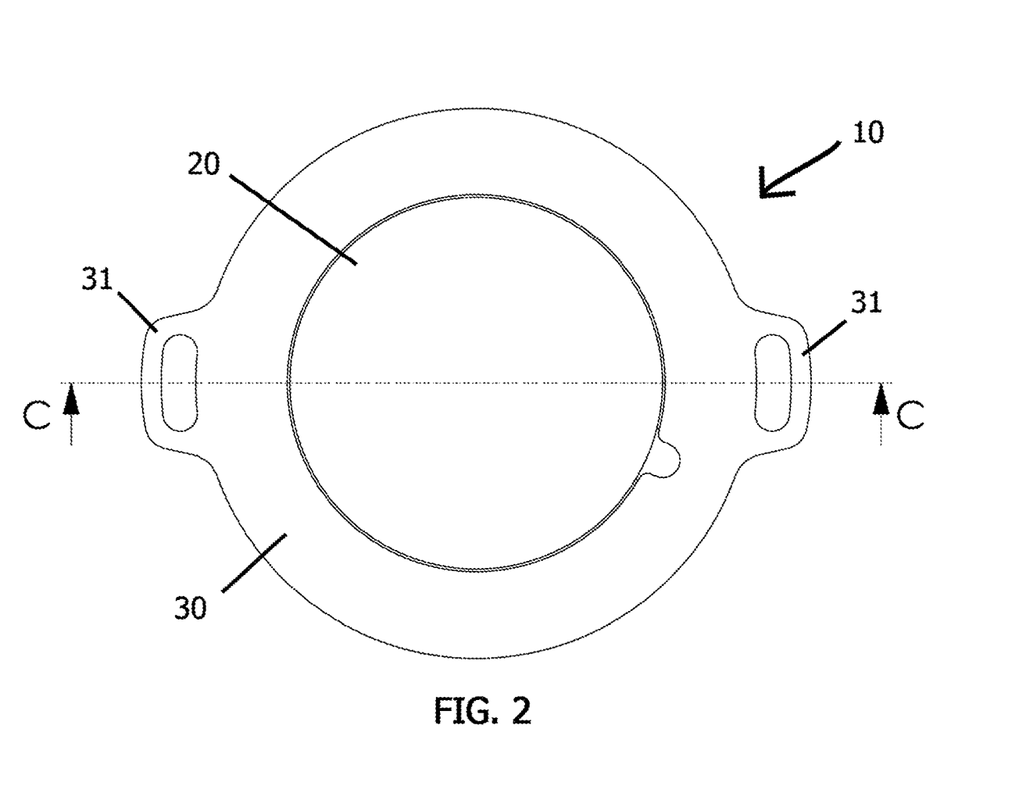
FIG. 2 is a top plan view of the device of FIG. 1.
Figure 3:
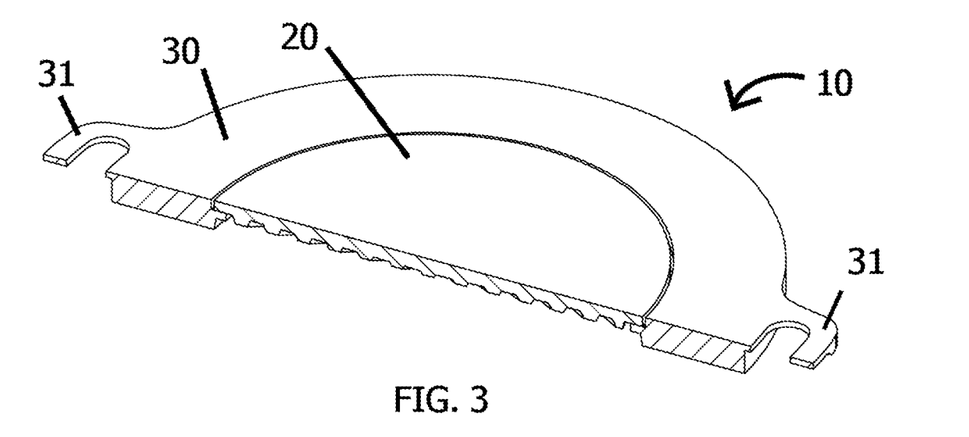
FIG. 3 is a top perspective sectional view of the device of FIG. 1, taken along the line C-C shown in FIG. 2.
Figure 4:
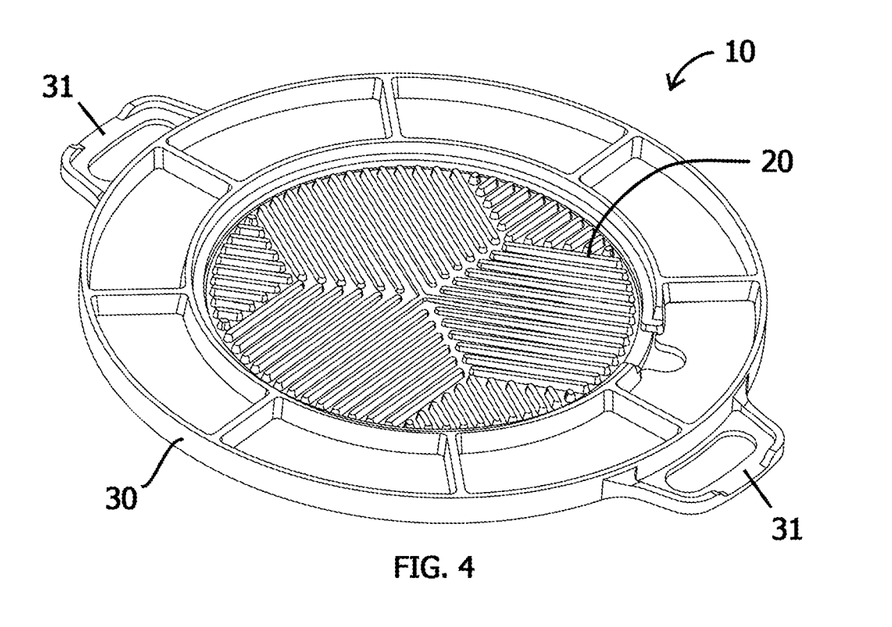
FIG. 4 is a bottom perspective view of the device of FIG. 1.

As depicted in FIGS. 1-3, frame 30 may have a generally annular ring shaped body with a thickness that is thicker than the thickness of the insert 20. In some embodiments, the annular ring shaped body of frame 30 may have an outer diameter from 15 to 75 cm and a thickness from 1 to 5 cm.

Frame 30 may optionally have one or more handles, such as handles 31 as illustrated in FIGS. 1-6 and 11-12. Each handle 31 may have a generally ear-shape and have a grip portion for convenient gripping and handling by a human hand. As depicted in the figures, an embodiment of frame 30 may have two handles 31 on opposite sides of the frame body and each handle 31 may have a finger/thumb notch or opening 42 for convenient gripping and handling using both hands of a user. The frame 30 may be used for carrying the insert 20, such as from a table or countertop to an oven or a grill device, and vice versa. As such, the frame 30 may be configured and sized for easy handling and convenient transportation.

The frame 30 may be made of cast iron, cast aluminum, a composite material, or any other suitable material for cookware used to bake or grill foodstuff. Other suitable materials may include stainless steel, carbon steel, copper, or ceramic materials.

During use, insert 20 may be inserted into the opening 32 of frame 30 to form a cookware having a top surface for cooking foodstuff thereon and a bottom surface for receiving heat from a heat source, such as oven, stove, grill, burner, or the like. The insert 20 may be coupled to frame 30 with the first, flat side 22 facing up or the second, corrugated side 24 facing up.

In some embodiments, the insert 20 and frame 30 may be structured and sized such that when the insert 20 is received at the opening 32 with the first (flat) side 22 facing up, the first side 22 and the top surface of the annular ring body of frame 30 are generally flush, thus forming a generally level, flat cooking surface.

In some embodiments, the opening 32 of frame 30 may have a stepped inner edge 38 for supporting the insert 20 on the step 40 of the inner edge 38 and stopping the insert 20 from falling through the opening 32. The inner diameter of the step 40 is smaller than the inner diameter of the opening 32 above the step 40, such as by about 1 to 30 mm. Thus, the step 40 provides a flat supporting surface, which has a generally annular ring shape, for supporting the edge portion 26 of the insert 20 thereon. The step 40 can be continuous, as depicted in the figures, in some embodiments. The step 40 may have a thickness of about 0.5 cm.

In other embodiments, multiple separate step sections or tabs (not shown) may be provided around the inner edge 38 of the frame body to provide supporting tabs for supporting the insert 20 thereon. In some embodiments, multiple steps may be provided at the inner edge 38 of the frame body to support different inserts having different outer diameters. For example, a first step may be used to support insert 20, and a second step (not shown) may be provided to support another insert having a smaller outer diameter.

The flat first side 22 of insert 20 may be used to provide a baking surface or griddle.

Figure 7:
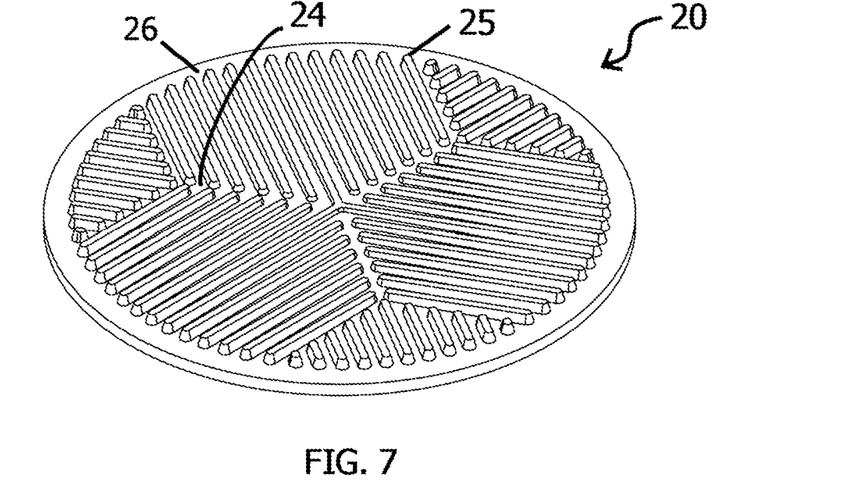
FIG. 7 is a bottom perspective view of the insert in the device of FIG. 1.
Figure 8:
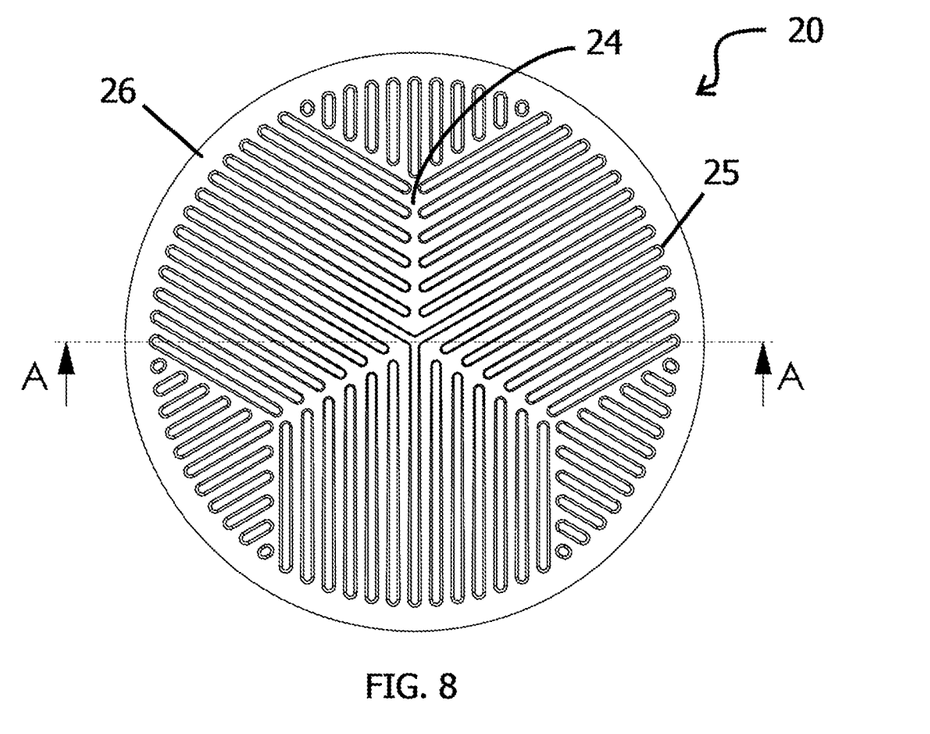
FIG. 8 is a bottom view of the insert of FIG. 7.
Figure 9:
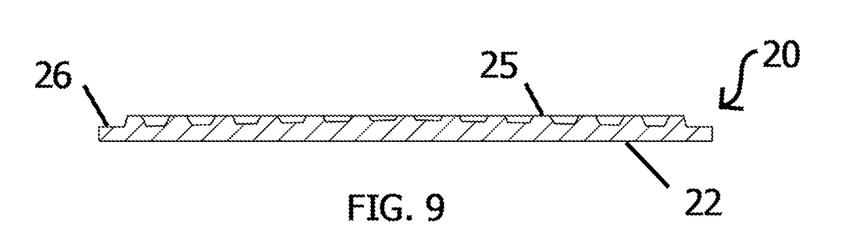
FIG. 9 is cross-sectional view of the insert of FIG. 7, taken along the line A-A in FIG. 8.
Figure 10:
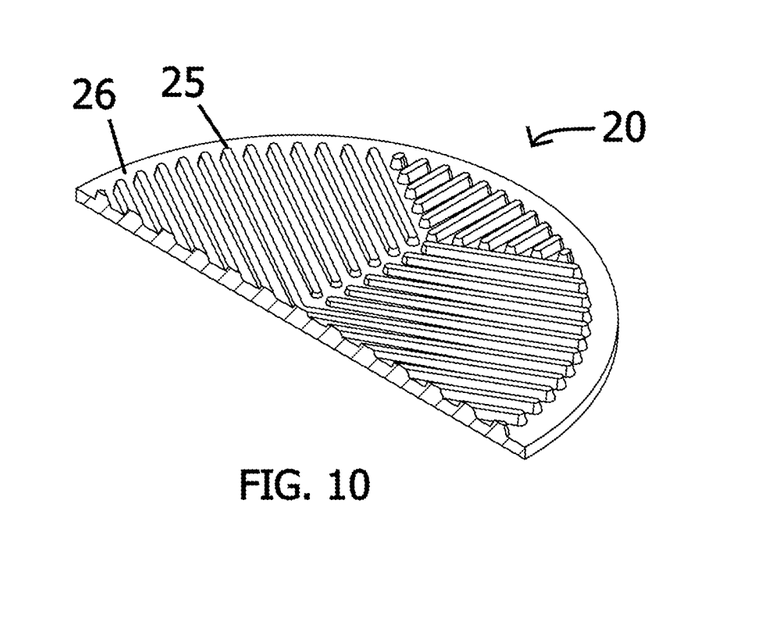
FIG. 10 is a perspective sectional view of the insert of FIG. 7.
Figure 11:
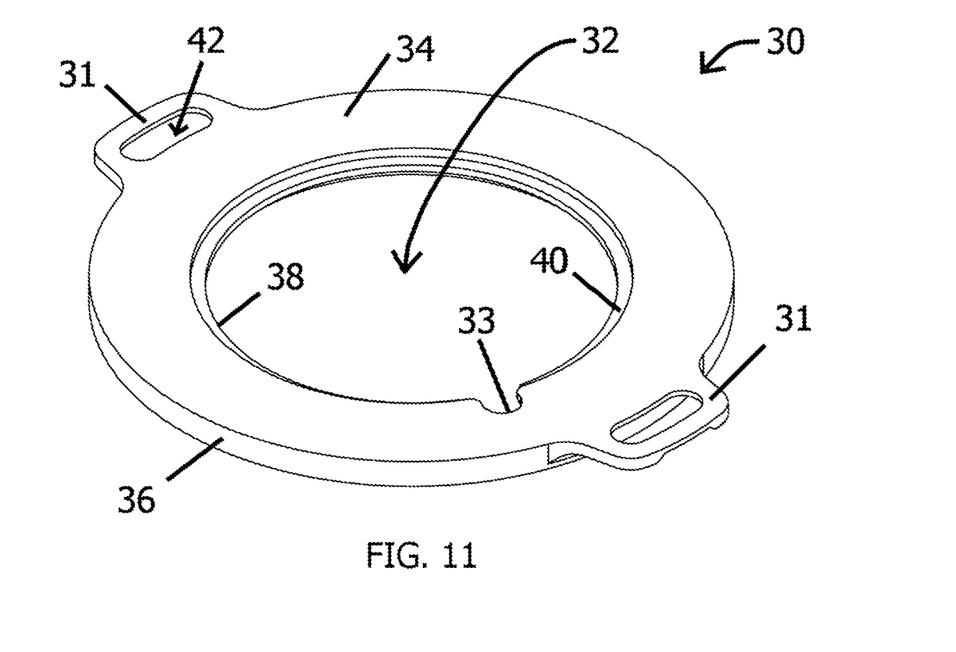
FIG. 11 is a top perspective view of the frame in the device of FIG. 1.

As better illustrated in FIG. 7, the ridges 25 on the corrugated second side 24 of insert 20 may be spaced evenly and uniformly across the second side 24, or a portion thereof. The ridges 25 may be configured to provide a grill top. Thus, insert 20 conveniently provides a reversible grill/griddle device. The ridges 25 may have different lengths, widths, heights, spacing, and patterns in different embodiments. The ridges 25 may be provided on only a portion of the second side 24, such as in an area of from about 50% to about 99% of the second side 24 of insert 20. As can be appreciated by those skilled in the art, when the corrugated surface of insert 20 is used as the cooktop, the benefits of a grilling device can be achieved, which may include providing slower cooking, or searing a cooked item such as meat, seafood, or a vegetable. The corrugated cooktop can also be used to steam foodstuff by allowing moisture to build up in the open spaces between the ridges 25. The ridges 25 may also serve as a rack for roasting or grilling, and allowing melt fat or other liquid from the cooked foodstuff to drain along the valleys between the ridges 25, without further contact with the foodstuff being cooked.

When the insert 20 is made of cast iron or cast aluminum, which has a relatively high thermal conductivity, the cooking temperatures across the cooking surface may be relatively uniform. Further, when the frame 30 is also made of the same material as the insert 20, due to the thermal contact at the edge portion 26 of insert 20 and the step 40 of the frame 30, the top surfaces of the insert 20 and frame 30 can provide an integrated and relatively uniform cooking surface.

In some embodiments, the main bodies of the insert 20 and frame 30 may be made of the same material, or made of different materials that have the same or similar coefficients of thermal expansion.

Figure 5:
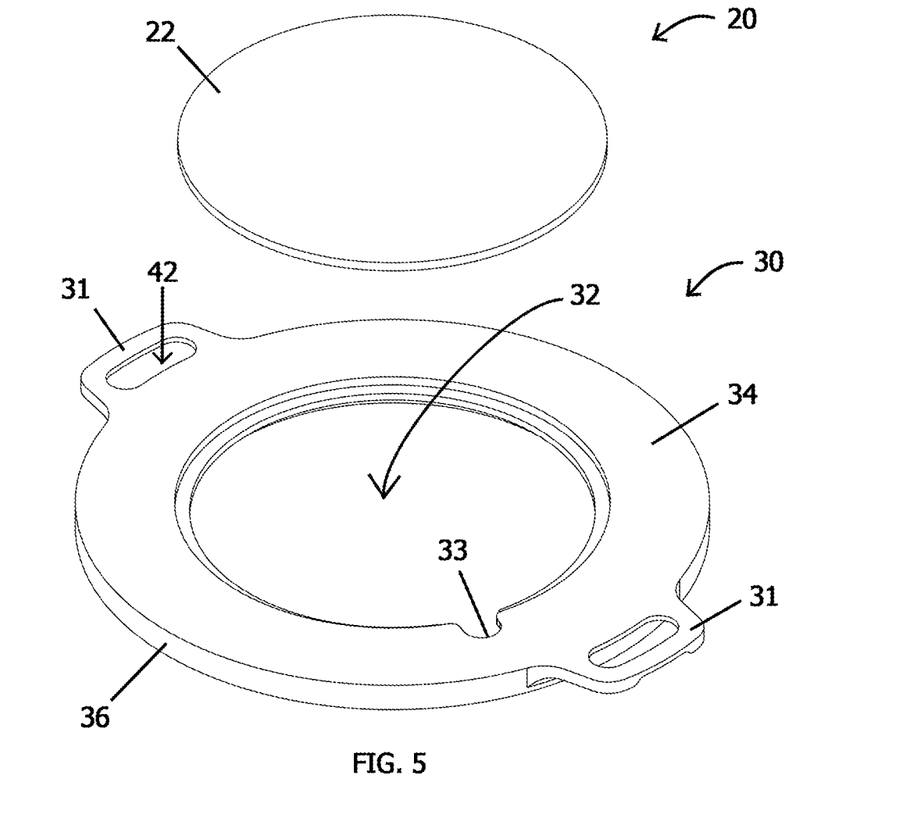
FIG. 5 is a top exploded perspective view of the device of FIG. 1.
Figure 6:
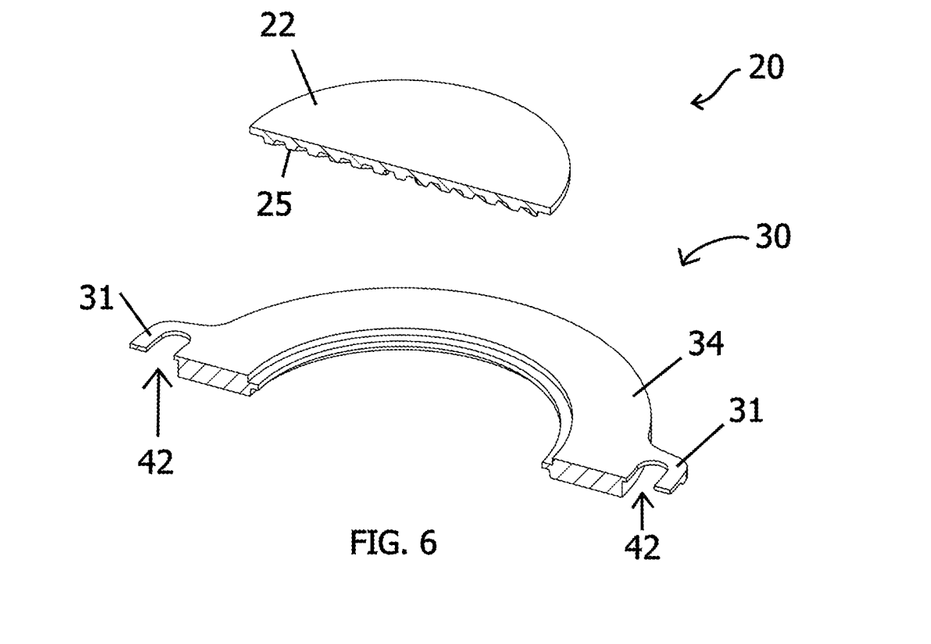
FIG. 6 is a top exploded perspective sectional view of the device of FIG. 1.

As illustrated in FIG. 5, a recess, finger notch 33, may be provided at the inner edge 38 of the opening 32, for convenient assembly and removal of insert 20 from the opening 32 of frame 30.

Figure 12:
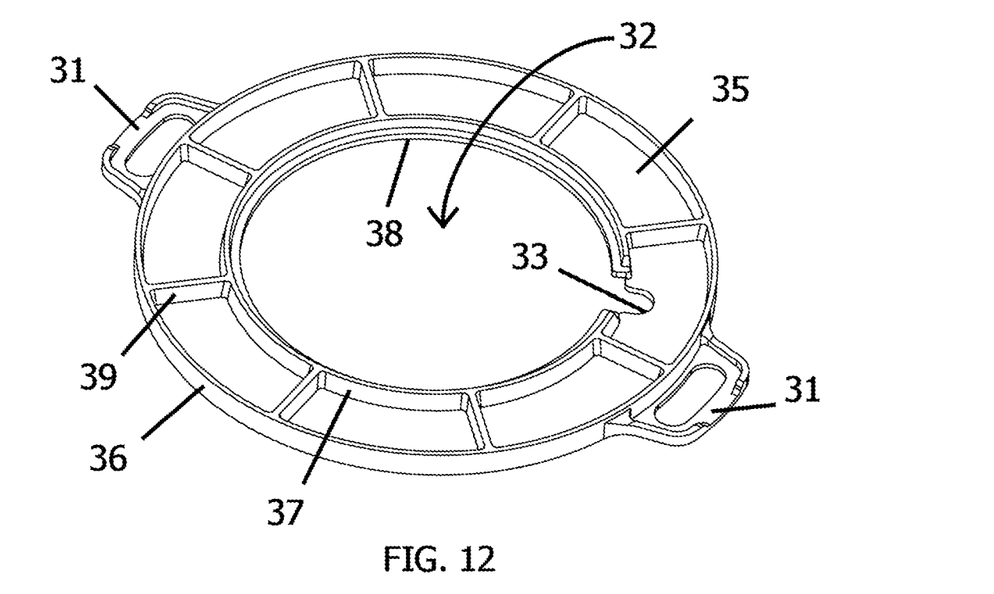
FIG. 12 is a bottom perspective view of the frame of FIG. 11.

In some embodiments, as illustrated in FIG. 12, the bottom surface 35 of the frame 30 may have a number of recesses, or compartments, formed between the outer perimeter wall 36, an inner circular wall 37 adjacent to the inner opening 32, and radially extending walls 39, which forms ribs for separating the different compartments.

The different recesses or compartments may be used to store or cook different food items when frame 30 is turned upside down with the bottom surface 35 of frame 30 facing up.

Figure 12A:
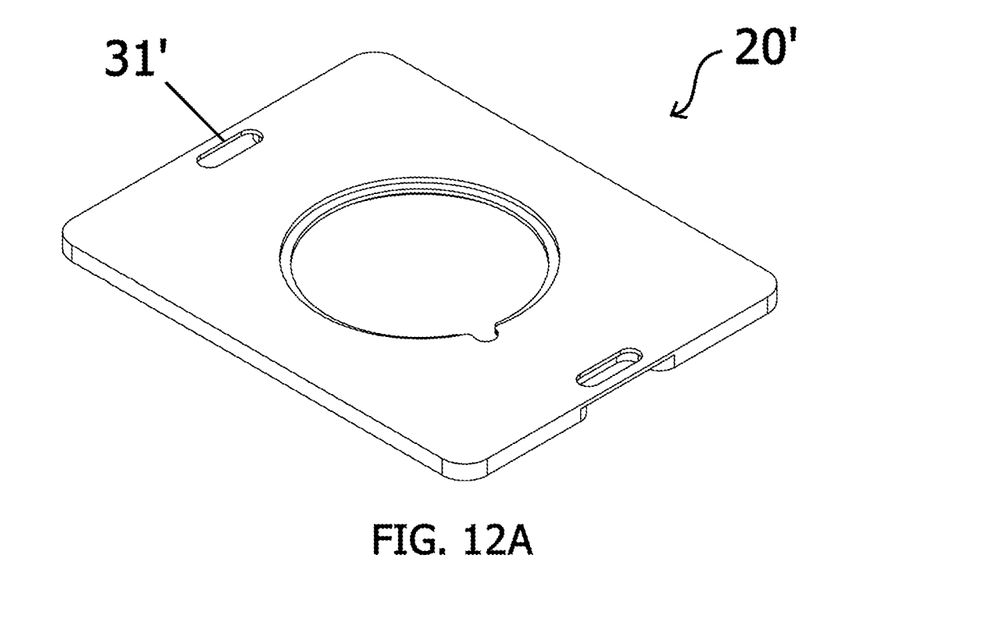
FIG. 12A is a perspective view of an alternative frame, according to another embodiment of the present disclosure.

As can be understood, the insert 20 and frame 30 may have different sizes and shapes in different embodiments. For example, FIG. 12A illustrates an alternative embodiment of the frame, frame 20', which has a generally rectangular or square outer profile with rounded corners and gripping openings 31' instead of protruding handles. Frame 20' is otherwise similar to frame 20. Frame 20' may have a length of from 20 cm to 50 cm and a width of from 20 cm to 50 cm millimeters.

The outer profile or perimeter of the frame in different embodiments may also have other generally polygonal shapes such as regular polygons, or equiangular quadrilateral polygons, but with or without rounded or curved corners.

Figure 13:
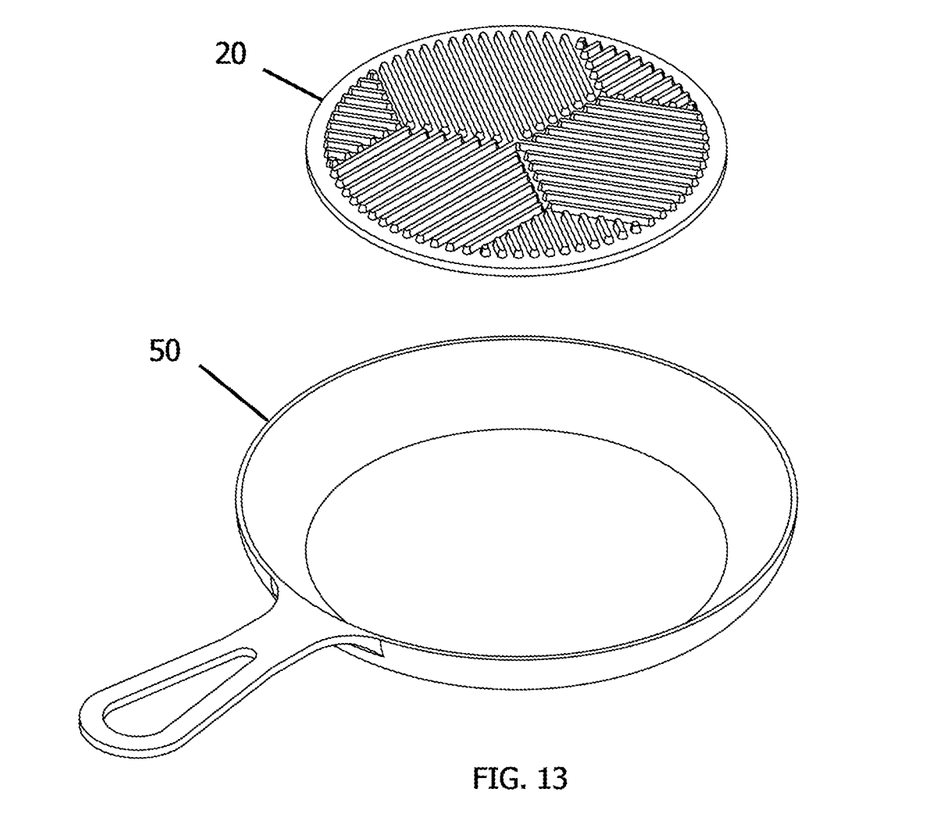
FIG. 13 is an exploded view of a combination of the insert of FIG. 1 and a skillet.
Figure 14:
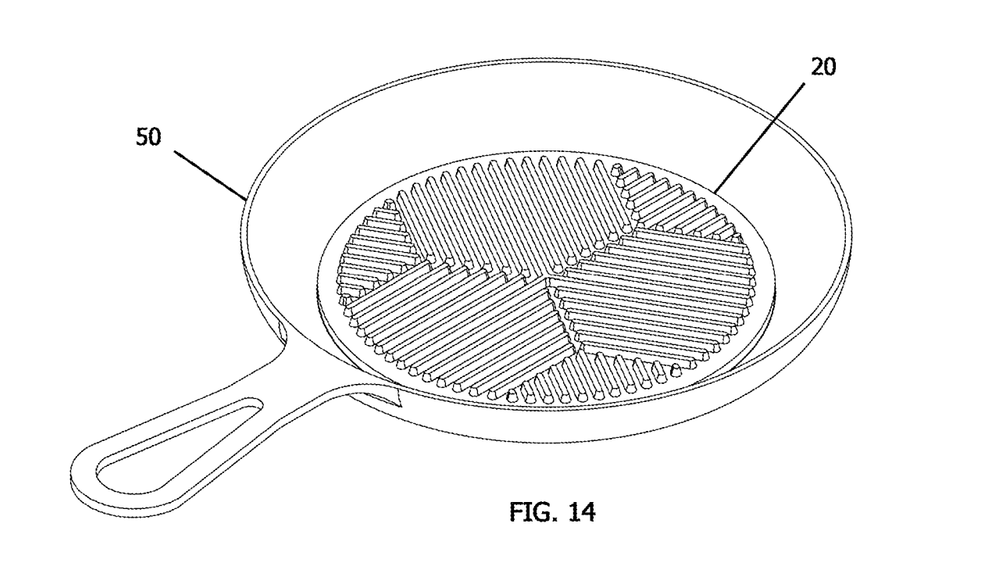
FIG. 14 is a perspective view of the combination of FIG. 13.

Conveniently, the insert 20 may also be used in combination with another cookware or cooking utensil such as a frying pan, skillet, pot, or the like. For example, the insert 20 may be placed on the top cooking surface of a frying pan 50, with the corrugated second side 24 facing up as illustrated in FIGS. 13 and 14. The combined skillet 50 and insert 20 provide a grilling device.

As now can be appreciated, in some embodiments, a set of cookware may be provided, which includes one or more frame 30 and a number of insert 20 having different sizes, shapes or compositions. For example, the inserts may have different outer diameters, or different ridge patterns on the corrugated side, or are made of different materials.

In some embodiments, the set of cookware may also include one or more other cookware such as one or more skillets, frying pans, or pots.

It is understood that the above descriptions and illustrations are intended to be illustrative and not restrictive. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

It should also be understood that modifications and variations to the specific embodiments described above are possible.

CONCLUDING REMARKS

It is to be understood that the figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the subject matter disclosed herein.

In addition, any specific numerical value listed herein includes a margin of error of +/−10%.

In the present disclosure, terms such as "horizontal" and "flat" do not necessarily require the relevant structure be perfectly horizontal or flat. Instead, these terms are intended to encompass structure that is generally and sufficiently horizontal or flat, for example, so as to function essentially the same as structure that is perfectly horizontal or flat.

It will be understood that any range of values herein is intended to specifically include any intermediate value or sub-range within the given range, and all such intermediate values and sub-ranges are individually and specifically disclosed.

It will also be understood that the word "a" or "an" is intended to mean "one or more" or "at least one", and any singular form is intended to include plurals herein.

It will be further understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

Of course, the above described embodiments of the present disclosure are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A set of cookware, comprising:
    a frame having an opening; and
    a plurality of inserts each removably couplable to the frame at the opening, wherein the inserts are circular and differ from one another in diameter,
    wherein the frame and each insert when coupled to each other form a cooking plate comprising a top cooking surface for supporting foodstuffs thereon and a bottom heat-receiving surface for receiving heat from a heat source,
    wherein each insert comprises a first side having a generally flat surface and a second side having a corrugated surface comprising a pattern of ridges, and is couplable to the frame with the first or second side facing up so that the first or second side facing up forms a part of the top cooking surface.

2. The set of cookware of claim 1, wherein the frame is configured and sized to be placed on and to receive heat from an oven, stove, or barbecue grill.

3. The set of cookware of claim 1, wherein the opening of the frame and the inserts have generally circular profiles.

4. The set of cookware of claim 1, wherein the frame comprises at least one handle.

5. The set of cookware of claim 1, wherein the frame has a generally circular outer perimeter.

6. The set of cookware of claim 1, wherein the frame has a generally annular ring shape.

7. The set of cookware of claim 1, wherein the inserts are configured and sized so that each insert is placeable on a flat top surface of a frying pan or skillet to provide a cooking surface on the frying pan or skillet.

8. The set of cookware of claim 1, wherein the opening of the frame comprises a stepped inner edge for supporting at least one of the plurality of inserts.

9. The set of cookware of claim 8, wherein the stepped inner edge is configured and sized so that a top surface of said at least one insert is flush with a top surface of the frame when said at least one insert is coupled to the frame.

10. The set of cookware of claim 8, wherein the stepped inner edge comprises a plurality of steps each for supporting a respective one of the plurality of inserts.

11. The set of cookware of claim 1, wherein at least 50% of a total surface area of the second side of at least one of the inserts is corrugated.

12. The set of cookware of claim 1, wherein at least one of the inserts and the frame comprises cast iron or cast aluminum.

13. The set of cookware of claim 1, wherein each insert comprises a plate having a thickness of from 0.5 cm to 2.5 cm.

14. The set of cookware of claim 13, wherein each insert comprises a circular plate having a diameter of from 10 cm to 50 cm.

15. The set of cookware of claim 1, wherein the frame has a thickness of from 1 cm to 5 cm.

16. The set of cookware of claim 1, wherein the frame has an outer diameter of from 15 cm to 75 cm.

17. The set of cookware of claim 1, wherein the opening of the frame is generally circular and has a diameter of from 10 cm to 50 cm.

18. The set of cookware of claim 1, wherein the frame has a generally rectangular outer perimeter.

19. The set of cookware of claim 1, wherein the inserts further differ from one another in at least one of shape and composition.

20. The set of cookware of claim 19, further comprising a frying pan or skillet.

* * * * *